Figure 1:
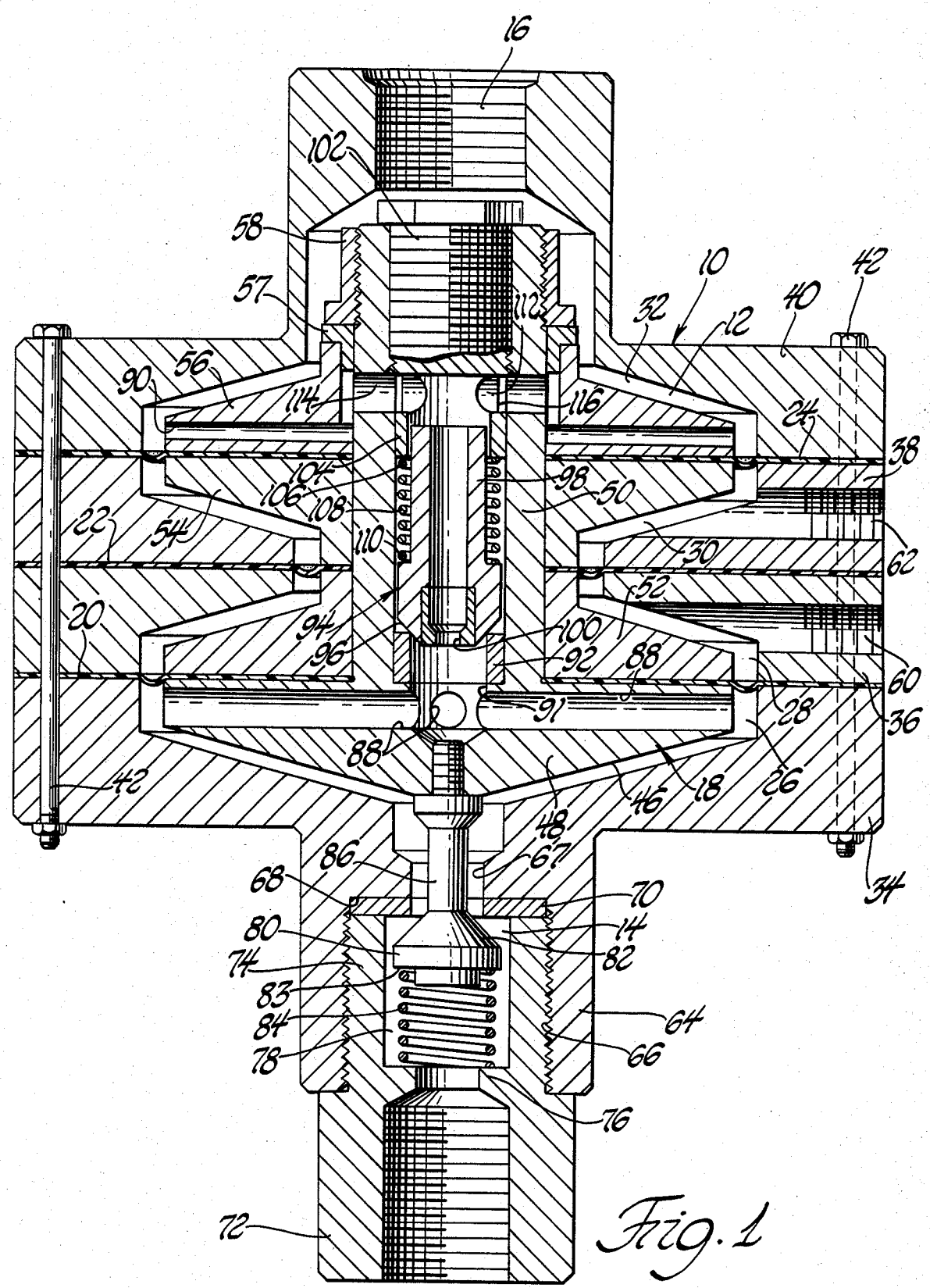

United States Patent [19]

Wright

[11] Patent Number: 4,549,572
[45] Date of Patent: Oct. 29, 1985

[54] PRESSURE COMPENSATED FLUID FLOW REGULATOR

[75] Inventor: Dolph D. Wright, Union Lake, Mich.

[73] Assignee: General Motors Corporation, Detroit, Mich.

[21] Appl. No.: 653,556

[22] Filed: Sep. 24, 1984

[51] Int. Cl.[4] ............................................. G05D 7/03
[52] U.S. Cl. .................................... 137/495; 137/501
[58] Field of Search ........................ 137/495, 501, 503

[56] References Cited

U.S. PATENT DOCUMENTS

| | | |
|---|---|---|
| 2,602,467 | 7/1952 | Griswold . |
| 3,028,876 | 4/1962 | Gratzmuller ........................ 137/501 |
| 3,482,592 | 12/1969 | Johnson . |
| 3,794,060 | 2/1974 | Perkins . |
| 4,368,852 | 1/1983 | Sharp . |
| 4,497,341 | 2/1985 | Wright ............................ 137/501 X |

Primary Examiner—Robert G. Nilson

Attorney, Agent, or Firm—Warren D. Hill

[57] ABSTRACT

A fluid flow regulator for fluids containing fine solids in suspension, such as paint, has a sharp-edged orifice to meter fluid in accordance with pressure across the orifice. The pressure is determined by throttling action of a main poppet valve carried by a spool and controlled by three diaphragms. Valve opening pressures on the diaphragms are downstream fluid pressure, and pilot air pressure while valve closing diaphragm forces are applied by the regulated fluid pressure downstream of the poppet. This regulator is fully pressure-compensated for variations in downstream pressure. Valve leakage is positively prevented by applying pilot air pressure in a manner to seat the poppet valve. Valve flushing at a high flow rate is permitted by a second poppet which carries the sharp-edged orifice and opens to allow a bypass of the orifice during flushing. Flushing action is actuated by high pilot air pressure forcing the main poppet valve to full open position.

7 Claims, 2 Drawing Figures

PRESSURE COMPENSATED FLUID FLOW REGULATOR

This invention relates to a pressure compensated fluid flow regulator valve and more particularly to such a regulator subject to remote control and suitable for fluids containing fine solids such as paint.

In paint systems, such as those used for painting automotive vehicles, accurate control of paint flow to a spray gun or other paint applicator is important since the ability to apply just the right amount of paint enhances product quality as well as affecting the economy of material usage. To achieve that goal, it is also important to be able to adjust or vary the fluid flow rate either manually or automatically from a remote location. Fluid control valves or other regulators for fluids containing a finely divided solids such as paint are subject to particular problems, e.g., sticking, failure to completely shut off flow, accuracy of control, and difficulty of cleaning to effect quick color change.

It is therefore an object of this invention to provide a pressure compensated fluid flow control valve or regulator which is subject to accurate remote control and suitable for fluids containing finely divided solids. It is another object of the invention to provide such a fluid flow control valve which achieves positive shut-off when commanded by remote control. Still another object of the invention is to provide such a fluid flow regulator which is readily cleaned by a flushing operation.

The invention is carried out by a regulator having a housing defining an inner cavity with inlet and outlet ports; a spool axially shiftable within the housing and supported therein by a plurality of diaphragms each of which connects the spool to the housing; a poppet carried by the spool for seating in the inlet port for regulating fluid pressure downstream of the poppet; a pilot pressure chamber defined by two of the diaphragms for applying pilot pressure in opposition to the regulated fluid pressure; a chamber adjacent the outlet port for applying outlet pressure to the spool and to another diaphragm also in opposition to the regulated fluid pressure to afford downstream pressure compensation, and an inner passage in the spool containing a sharp-edged orifice to control the fluid flow therethrough as a function of the difference between the regulated pressure and the outlet pressure. The invention further comprehends that the sharp-edged orifice will be included in a central passageway of a second poppet normally biased to closed position but subject to opening during high pressures associated with a flushing operation to bypass the sharp-edged orifice and to allow high flushing flow rates. The invention additionally includes a chamber between two of the diaphragms normally vented to atmosphere but subject to fluid pressure at the time of control valve shut-off to assure that the poppet in the inlet port tightly seats to prevent leakage through the regulator.

Figure 2:
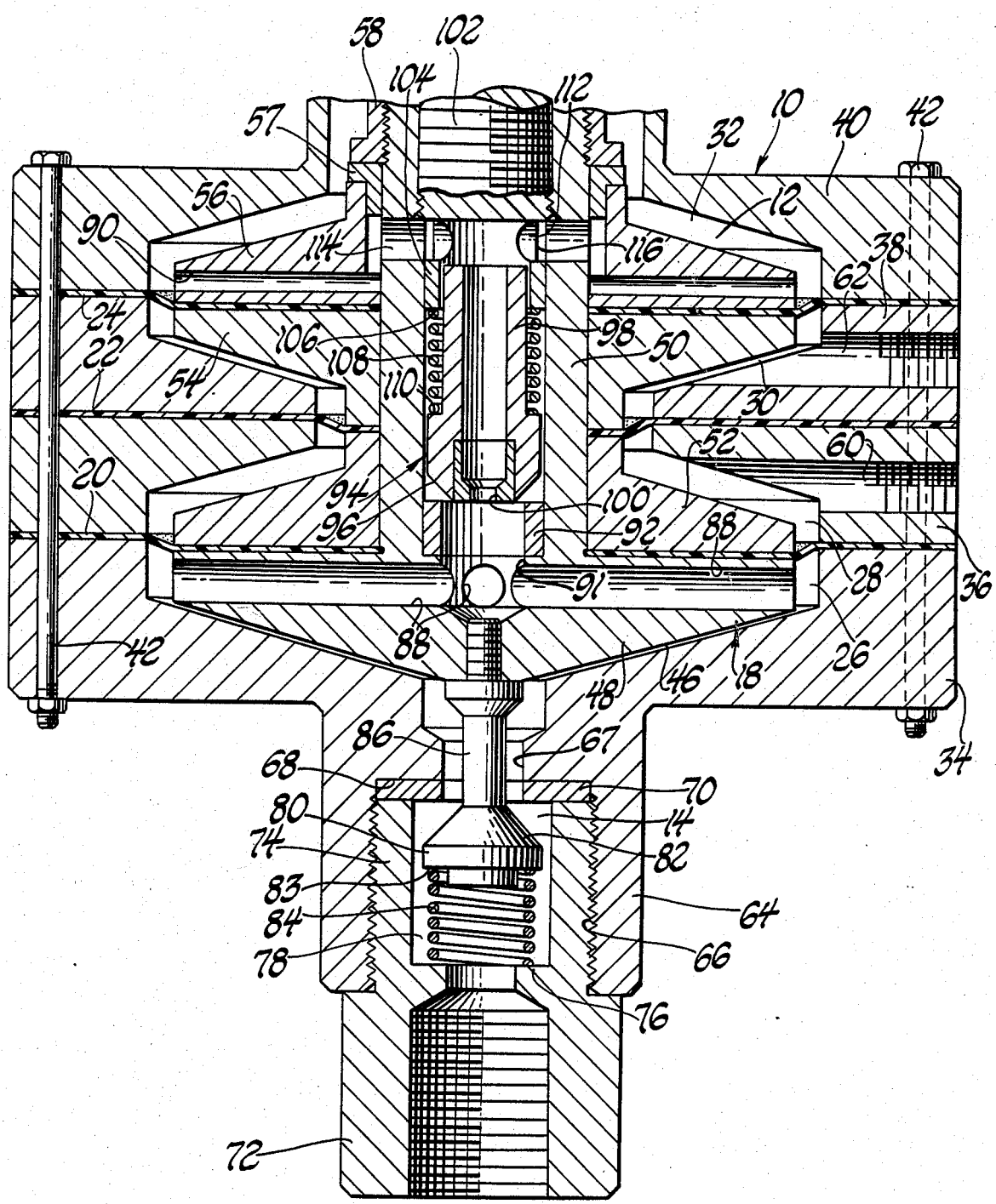

The above and other advantages will become more apparent from the following description taken in conjunction with the accompanying drawings wherein:

FIG. 1 is a cross-sectional view of a fluid flow regulator according to the invention shown in regulating position; and FIG. 2 is a partial view of the fluid flow regulator of FIG. 1 shown in open flushing position.

The particular flow control valve described herein is particularly designed for use with fluids containing fine solids such as paint and thus being particularly well suited to cope with the particular problems caused by such fluids. The principles of the control valve, according to the invention however are applicable to uses with other types of fluids as well. The control valve is pilot operated to achieve proportional flow, flushing, and a positive shut-off. Ordinarily, when used in paint systems, the pilot pressure would be applied in the form of an air pressure signal. However, other fluids can be used for the pilot pressure.

Referring to FIG. 1, the fluid flow regulator comprises a housing 10, having an inner cavity 12 and axially aligned inlet and outlet ports 14 and 16. A spool 18 within the inner cavity 12 is suspended therein and connected to the housing 10 by three diaphragms 20, 22 and 24. These diaphragms divide the inner cavity 12 into four chambers 26, 28, 30 and 32. The housing 10 is formed of a series of stacked sections 34, 36, 38 and 40 held together by tie bolts 42. The radial outer portions of the diaphragms are clamped between adjacent housing sections. The spool 18 is comprised of several stacked sections which, when assembled, are clamped to the radially inner portions of the diaphragms to flexibly secure the spool within the housing. The spool 18 includes a main section 46 which is mushroom-shaped having a cap 48 and a hollow stem portion 50, the stem portion being axially aligned with the inlet and outlet ports 14 and 16, respectively. A spool section 52 comprises an annular portion with a central bore large enough to fit over the stem portion 50 of the main section 46 and also has a radially flared flange having the same outer diameter as the cap 48 and mates with a surface of the cap 48 to trap the inner portion of the diaphragm 20. Another spool section 54 is shaped like the section 52 but is reversed in attitude so that it also fits around the stem portion 50 of the main section 46 and its small diameter shank portion mates with the similar shank portion of the section 52 to trap an inner portion of the diaphragm 22 therebetween. Section 54 also has a radial flange of the same diameter as the cap 48. Another spool section 56 is saucer-shaped with a central bore which fits loosely over the stem portion 50 and is coextensive with the flange of the section 54 so that the inner portion of the diaphragm 24 is clamped between the sections 54 and 56. A hat-shaped washer 57 surrounds the stem portion 50 and has a sleeve extending between the bore in the section 56 and the stem portion 50. A nut 58, mating with exterior threads on the stem portion 50 and bearing on the washer 57, compresses the sections 52, 54 and 56 as well as the inner diaphragm portions between the cap 48 and the washer 57 to secure the assembly.

The housing sections 36 and 38 have a minimum radial thickness at the planes where they contact the diaphragms 20 and 24, but they protrude inwardly toward the spool 18 to define a much greater housing thickness where they meet the diaphragm 22 so that the effective diameter of the diaphragm 22 is much smaller than the effective diameters of the diaphragms 20 and 24. This inner protrusion of the housing wall somewhat conforms the shape of the inner cavity 12 to the shape of the spool 18. The radial distance of the spool from the housing is substantially the same in the region of each of the three diaphragms. The inner walls of the housing sections 34 and 40 are tapered in conformity with the shape of the cap 48 of the main spool section 46 and with the saucer-shaped section 56 so as to minimize the fluid volume within the regulator. A radial port 60 extends through the section 36 to couple pilot air pressure to the chamber 28 which is defined by the diaphragms 20 and 22, the housing section 36 and the spool section 52. Similarly, a radially extending port 62 in the housing section 38 couples atmospheric pressure or positive shut-off pilot pressure to the chamber 30 which is defined by the diaphragms 22 and 24, the housing section 38, and the spool section 54. In the region of the inlet port 14, the housing section 34 has a tubular extension 64 having a partially threaded inner bore 66 and an inwardly extending shoulder 68 forming a passageway 67 smaller than the bore 66 and providing a mounting surface for an annular valve seat insert 70. A pipe coupling adapter 72 is threaded into the extension 64 to form a further inlet passage portion and has an inner tubular extension 74 which engages the valve seat insert 70 to trap it against the shoulder 68. An inwardly extending shoulder 76 on the adapter 72 serves as a spring seat and further serves to define an antechamber 78 between the valve seat insert 70 and the shoulder 76. A poppet 80 is disposed in the antechamber 78 and has a conical forward surface 82 for engaging the valve seat insert 70 and a rear flat surface with a peripheral groove 83 holding a coiled compression spring 84 which seats against the shoulder 76 to urge the poppet toward the seat insert 70. The poppet 80 includes a stem portion 86 which extends through the reduced passageway 67 and is threadedly coupled to the center of the main spool section 46 for movement therewith.

The regulator chamber 26—defined by poppet 80, cap 48 of spool section 46, diaphragm 20, and housing section 34—communicates with the hollow stem portion 50 of the main spool section 46 through radial passages 88 extending through the cap section 48 from a region at the largest diameter of the cap section near the diaphragm 20. The hollow stem portion 50, in turn, communicates through radial passages 90 in the largest diameter portion of the spool section 56 with the chamber 32. The stem portion 50 has a uniform bore except for a reduced shoulder portion 91 near the cap 48 which includes a second valve seat insert 92 downstream of the passages 88. A poppet 94 has a head 96 for contact with the valve seat insert 92, a hollow body 98 extending coaxially with the bore of the stem portion 50 and a sharp-edged orifice 100 in the head 96 to define a passageway entirely through the poppet 94 when it is seated. A plug 102, threaded into the bore of the stem portion 50, has a tubular sleeve 104 positioned between the inner surface of the stem portion 50 and the outer surface of the body 98 to serve as a loose guide for the body 98. The free end 106 of the sleeve 104 also serves as a spring seat and a coil spring 108 extends therefrom to a radial flange 110 on the rear of head 96 of poppet 94 so that the spring 108 urges the poppet into engagement with the seat insert 92. The diameter of the head 96 is somewhat smaller than that of the bore of stem portion 50. The resulting clearance around the poppet 94 permits fluid flow when the poppet head 96 is unseated. Radial ports 112, 114, in the plug 102 and stem portion 50 respectively allow fluid flow from the hollow stem 98 to the radial passages 90. A groove 116 around the plug 102 facilitates flow between the ports 112 and 114. Flow from the ports 114 to the passages 90 passes through the enlarged bore of the spool section 56.

In operation, with no pilot pressure applied to the control valve, both poppets 80,94, will be closed by virtue of the spring action so that there is essentially no flow. To preclude leakage around the poppet 80, pilot pressure is applied to the chamber 30 via the port 62 so that the poppet 80 will experience additional closing force.

During normal fluid flow regulation, the port 62 is vented to atmosphere to provide a reference for other pressures within the regulator as well as for isolation. Controlled pilot pressure is applied to the port 60, thereby pressurizing the chamber 28 by an amount which is a function of the desired fluid flow rate through the regulator. The pressure in chamber 28 forces the poppet 80 from its seat to allow fluid flow under pressure into the chamber 26. When the pressure in chamber 26 becomes sufficient to offset the pressure in chamber 28, the poppet 80 assumes a throttling position which maintains a regulated pressure in the chamber 26. As the fluid flows from the chamber 26 through the passages 88 and through the sharp-edged orifice 100 and toward the housing outlet port 16, the flow rate is determined by the orifice on the basis of the pressure differential across the orifice. Specifically, the flow rate is proportional to the square root of the pressure across the orifice.

Since restrictions downstream of the regulator can give rise to significant pressure at the outlet port 16, a pressure compensation feature serves to prevent a consequent reduction in flow rate. Pressure compensation is accomplished by the outlet pressure in chamber 32 acting against the spool 18 in a direction to urge the poppet 80 farther from its seat and over a spool and diaphragm area which is substantially the same as the spool and diaphragm area of chamber 26 so that just enough pressure is added to the chamber 26 to compensate for that in chamber 32. Thus the pressure across the sharp-edged orifice 100 is independent of the downstream pressure variations, and the fluid flow rate through the regulator is likewise independent of those pressure variations. In consequence, the pilot pressure applied to the port 60 is the only independent parameter determining the fluid flow rate. As is well known, the flow rate through a sharp edged orifice is also substantially independent of the fluid viscosity over a wide viscosity range so that viscosity is not a consideration in the flow rate determination.

For the purpose of flushing the valve—which occurs whenever cleaning is necessary prior to system shutdown or between color changes of paint or other fluid changes in the system—a pressure higher than that used for flow regulation is applied to the port 60 to force the poppet 80 to its full opened position. The fluid pressure in chamber 26 increases so that high pressure is applied across the poppet 94. The force of spring 108 is set to yield at this high pressure, causing the poppet 94 to move from its seat, thereby allowing fluid flow around the poppet—as well as through the sharp-edged orifice 100. FIG. 2 illustrates that valve position. The valve layout is such that the cleaning fluid courses throughout each portion of the fluid flow path, i.e., there are no stagnant regions for the collection of solids. The usual flushing process in a paint system, i.e., alternating high pressure pulses of solvent and air, establish sufficient turbulence and scrubbing action to thoroughly cleanse the valve interior.

In practice, the regulator was fabricated using anodized aluminum for the housing and spool sections, stainless steel for the poppets, Delrin TM for the valve seats, stainless steel for the orifice, and Dacron TM reinforced Mylar TM for the diaphragms. These materials are resistant to the effects of paint and cleaning solvents. The diaphragms 20 and 24 had effective working diameters of 2.2 inches, and diaphragm 22 had an effective diameter of 1.12 inches. For an orifice of 0.0465 inch diameter, an inlet fluid pressure of 60 psi and water as the regulated fluid, the regulator exhibited an accurately repeatable control range between 15 psi and 45 psi pilot air pressure applied to the port 60. At the end points of the range (15 and 45 psi), respective flow rates of 660 and 1060 cc/min occurred. With a 65 psi pilot pressure, flushing action occurred at a flow rate of 2900 cc/min.

It will thus be seen that the fluid flow regulator according to the invention has the features of accurate control, positive shut-off, immunity to both upstream and downstream pressure variations, thorough cleaning by flushing, and the ability to operate with fluids containing the fine solids. In addition, the control valve is easy to manufacture as well as to maintain.

The embodiments of the invention for which an exclusive property or privilege is claimed are defined as follows:

1. A fluid flow regulator responsive to pilot pressure comprising:
   a housing having a central cavity and inlet and outlet ports;
   a spool in the central cavity defining a space between the spool and the housing, the spool having a flow passage extending between a region of regulated pressure and a region of outlet pressure;
   a poppet for seating in the inlet port for controllably admitting fluid through the inlet port;
   means mounting the poppet on the spool for movement therewith;
   means for establishing a regulated pressure at one end of the flow passage by controlling the poppet position including a plurality of diaphragms between the spool and the housing, means for applying pilot pressure and outlet pressure to respective diaphragms to urge the poppet away from its seat, and means for applying regulated pressure to a diaphragm to urge the poppet toward its seat so that the regulated pressure is a function of the pilot pressure and the outlet pressure; and
   a sharp-edged orifice in the flow passage of the spool for regulating the fluid flow rate from the inlet port to the outlet port according to a function of the difference between the regulated pressure and the outlet pressure.

2. A fluid flow regulator responsive to pilot pressure comprising:
   a housing having a central cavity and inlet and outlet ports;
   a spool in the central cavity defining a space between the spool and the housing, the spool having a flow passage extending between a region of regulated pressure and a region of outlet pressure;
   a poppet for seating in the inlet port for controllably admitting fluid through the inlet port, means mounting the poppet on the spool for movement therewith;
   means for establishing a regulated pressure at one end of the flow passage by controlling the poppet position including a plurality of diaphragms between the spool and the housing, means for applying pilot pressure and outlet pressure to respective diaphragms to urge the poppet away from its seat, and means for applying regulated pressure to a diaphragm to urge the poppet toward its seat so that the regulated pressure is a function of the pilot pressure and the outlet pressure;
   a sharp-edged orifice in the flow passage of the spool for regulating the fluid flow rate from the inlet port to the outlet port according to a function of the difference between the regulated pressure and the outlet pressure; and
   poppet valve means in the flow passage of the spool for facilitating regulator flushing which when closed maintains fluid flow regulation by the orifice and when open bypasses the orifice to substantially increase the fluid flow rate.

3. A fluid flow regulator responsive to pilot pressure comprising:
   a housing having a central cavity and inlet and outlet ports;
   a spool in the central cavity defining a space between the spool and the housing, the spool having a flow passage extending between a region of regulated pressure and a region of outlet pressure;
   a poppet for seating in the inlet port for controllably admitting fluid through the inlet port, means mounting the poppet on the spool for movement therewith;
   means for establishing a regulated pressure at one end of the flow passage by controlling the poppet position including a plurality of diaphragms between the spool and the housing, means for applying pilot pressure and outlet pressure to respective diaphragms to urge the poppet away from its seat, and means for applying regulated pressure to a diaphragm to urge the poppet toward its seat so that the regulated pressure is a function of the pilot pressure and the outlet pressure;
   a sharp-edged orifice in the flow passage of the spool for regulating the fluid flow rate from the inlet port to the outlet port according to a function of the difference between the regulated pressure and the outlet pressure; and
   means for positively stopping fluid flow through the regulator comprising means for applying pilot pressure to a diaphragm in a direction to hold the poppet against its seat.

4. A fluid flow regulator responsive to pilot pressure comprising:
   a housing having a central cavity and axially aligned inlet and outlet ports;
   a spool in the central cavity defining a space between the spool and the housing;
   a poppet for seating in the inlet port for controllably admitting fluid through the inlet port, means mounting the poppet on the spool for movement therewith;
   first, second, and third diaphragms arranged in order from the poppet to the outlet port and secured to the spool and to the housing for dividing the space around the spool into four chambers, the first and third diaphragms having the same diameter and the second diaphragm having a smaller diameter, a first chamber between the poppet and the first diaphragm containing pressure-regulated fluid, a second chamber between the first and second diaphragms subject to pilot pressure, a third chamber between the second and third diaphragms being vented to atmosphere during flow control, and a fourth chamber between the third diaphragm and the outlet port being subject to the outlet fluid pressure, whereby the combined effects of the outlet pressure and the pilot pressure tend to urge the poppet away from its seat to increase the regulated pressure, and the regulated pressure opposes the pilot and outlet pressures to urge the poppet toward its seat so that a balanced poppet position and a regulated pressure are achieved;
a central passage in the spool extending between the first and fourth chambers; and
a sharp-edged orifice in the central passage of the spool for regulating the fluid flow rate from the first chamber to the outlet port according to a function of the difference between the regulated pressure and the outlet pressure.

5. A fluid flow regulator responsive to pilot pressure comprising:
a housing having a central cavity and axially aligned inlet and outlet ports;
a spool in the central cavity defining a space between the spool and the housing;
a poppet for seating in the inlet port for controllably admitting fluid through the inlet port, means mounting the poppet on the spool for movement therewith;
first, second, and third diaphragms arranged in order from the poppet to the outlet port and secured to the spool and to the housing for dividing the space around the spool into four chambers, the first and third diaphragms having the same diameter and the second diaphragm having a smaller diameter, a first chamber between the poppet and the first diaphragm containing pressure-regulated fluid, a second chamber between the first and second diaphragms subject to pilot pressure, a third chamber between the second and third diaphragms being vented to atmosphere during flow control, and a fourth chamber between the third diaphragm and the outlet port being subject to the outlet fluid pressure, whereby the combined effects of the outlet pressure and the pilot pressure tend to urge the poppet away from its seat to increase the regulated pressure, and the regulated pressure opposes the pilot and output pressures to urge the poppet toward its seat so that a balanced poppet position and a regulated pressure are achieved;
a central passage in the spool extending between the first and fourth chambers;
a sharp-edged orifice in the central passage of the spool for regulating the fluid flow rate from the first chamber to the outlet port according to a function of the difference between the regulated pressure and the outlet pressure; and
a second poppet in the central passage movable between open and closed positions, an axial passage in the second poppet, and the sharp-edged orifice being mounted in the axial passage so that the regulated flow passes through the second poppet, means for biasing the second poppet closed at regulated pressures used for flow control and for allowing the second poppet to open at higher pressures to bypass the sharp-edged orifice and effect flushing action through the regulator.

6. A fluid flow regulator responsive to pilot pressure comprising:
a housing having a central cavity and axially aligned inlet and outlet ports;
a spool in the central cavity defining a space between the spool and the housing;
a poppet for seating in the inlet port for controllably admitting fluid through the inlet port, means mounting the poppet on the spool for movement therewith;
first, second, and third diaphragms arranged in order from the poppet to the outlet port and secured to the spool and to the housing for dividing the space around the spool into four chambers, the first and third diaphragms having the same diameter and the second diaphragm having a smaller diameter, a first chamber between the poppet and the first diaphragm containing pressure-regulated fluid, a second chamber between the first and second diaphragms subject to pilot pressure during flow control, a third chamber between the second and third diaphragms, and a fourth chamber between the third diaphragm and the outlet port being subject to the outlet fluid pressure, whereby the combined effects of the outlet pressure and the pilot pressure tend to urge the poppet away from its seat to increase the regulated pressure, and the regulated pressure opposes the pilot and outlet pressures to urge the poppet toward its seat so that a balanced poppet position and a regulated pressure are achieved;
means for venting the third chamber to atmosphere during flow control and for admitting pilot pressure to the third chamber to positively close the poppet when the regulator is turned off;
a central passage in the spool extending between the first and fourth chambers; and
a sharp-edged orifice in the central passage of the spool for regulating the fluid flow rate from the first chamber to the outlet port according to a function of the difference between the regulated pressure and the outlet pressure.

7. A fluid flow regulator responsive to pilot pressure comprising:
a housing having a central cavity and axially aligned inlet and outlet ports;
a spool in the central cavity defining a space between the spool and the housing, the spool having a central passage;
a poppet for seating in the inlet port for controllably admitting fluid through the inlet port, means mounting the poppet on the spool for movement therewith;
first, second, and third diaphragms arranged in order from the poppet to the outlet port and secured to the spool and to the housing for dividing the space around the spool into four chambers, the first and third diaphragms having the same diameter and the second diaphragm having a smaller diameter, a first chamber between the poppet and the first diaphragm containing pressure-regulated fluid, a second chamber between the first and second diaphragms subject to pilot pressure, a third chamber between the second and third diaphragms being vented to atmosphere during flow control, and a fourth chamber between the third diaphragm and the outlet port containing fluid at the outlet pressure, whereby the combined effects of the outlet pressure and the pilot pressure tend to urge the poppet away from its seat to increase the regulated pressure, and the regulated pressure opposes the pilot and outlet pressures to urge the poppet toward its seat so that a balanced poppet position and a regulated pressure are achieved;

the spool having sections extending near the largest diameter regions of the fluid-containing chambers, a plurality of fluid passages extending radially through each said section for coupling the said largest diameter regions to the central passage of the spool to thereby establish a fluid flow path which sweeps through all regions of the fluid-containing chambers; and a sharp-edged orifice in the central passage of the spool for regulating the fluid flow rate from the first chamber to the outlet port according to a function of the difference between the regulated pressure and the outlet pressure.

* * * * *